(12) United States Patent
Wu et al.

(10) Patent No.: US 9,026,426 B2
(45) Date of Patent: May 5, 2015

(54) INPUT METHOD EDITOR

(75) Inventors: Genqing Wu, Beijing (CN); Xiaotao Duan, Beijing (CN); Tai-Yi Huang, Bellevue, WA (US)

(73) Assignee: Google Inc., Mountain View, CA (US)

( * ) Notice: Subject to any disclaimer, the term of this patent is extended or adjusted under 35 U.S.C. 154(b) by 791 days.

(21) Appl. No.: 13/141,958

(22) PCT Filed: Mar. 19, 2009

(86) PCT No.: PCT/CN2009/070889
§ 371 (c)(1),
(2), (4) Date: Jun. 23, 2011

(87) PCT Pub. No.: WO2010/105428
PCT Pub. Date: Sep. 23, 2010

(65) Prior Publication Data
US 2012/0016658 A1    Jan. 19, 2012

(51) Int. Cl.
*G06F 17/20* (2006.01)
*G06F 17/27* (2006.01)
(Continued)

(52) U.S. Cl.
CPC .......... *G06F 3/0233* (2013.01); *G06F 17/2863* (2013.01); *G06F 17/28* (2013.01); *G06F 3/018* (2013.01)

(58) Field of Classification Search
CPC ......... G06F 17/20; G06F 17/21; G06F 17/22; G06F 17/2217; G06F 17/2223; G06F 17/27; G06F 17/2705; G06F 17/2735; G06F 17/274; G06F 17/275; G06F 17/2755; G06F 17/2765; G06F 17/2785; G06F 17/28; G06F 17/2795; G06F 17/2818; G06F 17/2854; G06F 17/2863; G06F 17/289; G06F 17/2881; G06F 3/018

USPC ........ 704/1, 2, 4, 8, 9, 10; 715/257, 261, 262, 715/264
See application file for complete search history.

(56) References Cited

U.S. PATENT DOCUMENTS 5,270,927 A * 12/1993 Sproat ........................... 715/264
5,835,635 A    11/1998 Nozaki et al.
(Continued)

FOREIGN PATENT DOCUMENTS

| CN | 1406374 A | 3/2003 |
|---|---|---|
| CN | 1581041 A | 2/2005 |

(Continued)

OTHER PUBLICATIONS

Non-Final Office Action from U.S. Patent and Trademark Office mailed Jan. 22, 2013 for U.S. Appl. No. 13/141,060 (16 pages).
(Continued)

*Primary Examiner* — Paras D Shah
(74) *Attorney, Agent, or Firm* — Remarck Law Group PLC

(57) ABSTRACT

Methods, systems, and apparatus, including computer program products, in which an input method editor receives graphemes in a first writing system and identifies lexical items in a second writing system based on the graphemes in the first writing system. In one implementation, a method is provided. The method includes receiving a first grapheme in a first writing system; using a grapheme graph of graphemes in the first writing system to identify a first n-gram representation in the first writing system of a first morpheme in a second writing system; using the first n-gram representation to locate one or more first nodes in a morpheme graph; selecting a first lexical item from the one or more first lexical items based on a first score associated with each of the one or more first lexical items; and providing the first lexical item for display on a user device.

20 Claims, 9 Drawing Sheets

(51) Int. Cl.
  *G06F 3/023* (2006.01)
  *G06F 17/28* (2006.01)
  *G06F 3/01* (2006.01)

(56) References Cited

U.S. PATENT DOCUMENTS

| | | | |
|---|---|---|---|
| 5,862,256 A | 1/1999 | Zetts et al. | |
| 5,896,321 A | 4/1999 | Miller et al. | |
| 5,953,541 A | 9/1999 | King et al. | |
| 6,154,758 A * | 11/2000 | Chiang | 715/263 |
| 6,204,848 B1 | 3/2001 | Nowlan et al. | |
| 6,346,894 B1 | 2/2002 | Connolly et al. | |
| 6,356,866 B1 * | 3/2002 | Pratley et al. | 704/9 |
| 6,822,585 B1 * | 11/2004 | Ni et al. | 341/28 |
| 6,848,080 B1 * | 1/2005 | Lee et al. | 715/203 |
| 7,107,204 B1 | 9/2006 | Liu et al. | |
| 7,165,021 B2 * | 1/2007 | Sugano | 704/8 |
| 7,277,732 B2 * | 10/2007 | Chen et al. | 455/566 |
| 7,385,531 B2 | 6/2008 | Zhang | |
| 7,676,357 B2 * | 3/2010 | Chen et al. | 704/3 |
| 8,296,125 B2 * | 10/2012 | Shetty et al. | 704/4 |
| 8,365,071 B2 * | 1/2013 | Fux et al. | 715/262 |
| 2002/0196163 A1 | 12/2002 | Bradford et al. | |
| 2005/0057512 A1 * | 3/2005 | Du et al. | 345/168 |
| 2005/0289463 A1 * | 12/2005 | Wu et al. | 715/533 |
| 2006/0206313 A1 * | 9/2006 | Xu et al. | 704/10 |
| 2008/0221866 A1 * | 9/2008 | Katragadda et al. | 704/10 |
| 2008/0312911 A1 * | 12/2008 | Zhang | 704/10 |
| 2009/0225041 A1 | 9/2009 | Kida et al. | |
| 2010/0169770 A1 * | 7/2010 | Hong et al. | 715/261 |

FOREIGN PATENT DOCUMENTS

| | | |
|---|---|---|
| CN | 1643484 A | 7/2005 |
| CN | 1783066 A | 6/2006 |
| CN | 1851624 A | 10/2006 |
| CN | 1854998 A | 11/2006 |
| CN | 1908863 A | 2/2007 |
| CN | 101286092 A | 10/2008 |
| CN | 101369209 A | 2/2009 |
| JP | S5998236 A | 6/1984 |
| JP | H0896085 A | 4/1996 |
| JP | H1039894 A | 2/1998 |
| JP | H11338858 A | 12/1999 |
| JP | 2000268039 A | 9/2000 |
| JP | 2001312294 A | 11/2001 |
| JP | 2002007042 A | 1/2002 |
| JP | 2002518721 A | 6/2002 |
| JP | 2005530272 A | 10/2005 |
| JP | 2008250378 A | 10/2008 |
| WO | 9965212 A | 12/1999 |
| WO | 0148737 A | 7/2001 |
| WO | 2004001979 A | 12/2003 |

OTHER PUBLICATIONS

PCT International Search Report and Written Opinion for International Application No. PCT/CN2009/070888 dated Dec. 24, 2009 (9 pages).

PCT International Search Report and Written Opinion for International Application No. PCT/CN2009/070889 dated Nov. 19, 2009 (8 pages).

* cited by examiner w m q m g

FIG. 1A wo m qu mei guo

FIG. 1B wo men qu mei guo
我 們 去 美 國

FIG. 1C wo mei qu mei guo
我 沒 去 美 國

FIG. 1D w o m e i q u m e i g u o

FIG. 1E wo mei qu mei gu o
我 妹 去 梅 谷 哦

FIG. 1F

INPUT METHOD EDITOR

BACKGROUND

This specification relates to input methods.

A writing system uses symbols (e.g., characters or graphemes) to represent sounds of a language. A collection of symbols in a writing system can be referred to as a script. For example, a Latin writing system, including a collection of Roman characters in one or more Roman scripts, can be used to represent the English language. The Latin writing system can include blocked Roman characters (e.g., capitalized character "B"), typed Roman characters (e.g., plain character "b"), and cursive Roman characters (e.g., cursive character "b"). Each visual representation of the character "b" represents the same grapheme in the Latin writing system.

As another example, the Chinese language can be represented by more than one writing system. For example, the Chinese language can be represented by a first writing system, e.g., Pinyin (or Romanized Chinese). As another example, the Chinese language can be represented using a second writing system, e.g., Bopomofo or Zhuyin Fuhao ("Zhuyin"). As yet another example, the Chinese language can be represented using a third writing system, e.g., Hanzi. In particular, Pinyin and Zhuyin are phonetic systems for representing Hanzi characters.

Some input methods allow a user to input text in a first writing system and provide output candidates in a second writing system. For example, a Pinyin input method allows a user to input a Pinyin string and can generate output candidates in Hanzi. The Pinyin string can include one or more Pinyin syllables. A Pinyin syllable can be include a first sub-syllable (e.g., a portion of a syllable) followed by a second sub-syllable. Each Pinyin syllable corresponds to multiple Hanzi characters, and each sub-syllable includes one or more Roman characters. For example, a Pinyin syllable "zhang" can be segmented into a first sub -syllable "zh" and a second sub-syllable "ang". Furthermore, both sub-syllables "zh" and "ang" can be combined with other sub-syllables to create other Pinyin syllables. For example, sub-syllables "zh" and "a" can be combined to create the Pinyin syllable "zha", and sub-syllables "t" and "ang" can be combined to create the Pinyin syllable "tang".

Generating output candidates may require identification of morphemes (e.g., syllables) in the input text, e.g., by segmenting the input text.

SUMMARY

This specification describes technologies relating to input methods.

In general, one aspect of the subject matter described in this specification can be embodied in methods that include the actions of receiving a first grapheme in a first writing system; using a grapheme graph of graphemes in the first writing system to identify a first n-gram representation in the first writing system of a first morpheme in a second writing system, where the first n-gram representation includes the first grapheme; using the first n-gram representation to locate one or more first nodes in a morpheme graph, where each located first node in the morpheme graph represents one or more first lexical items in the second writing system, each of the one or more first lexical items represented by the first n-gram representation; selecting a first lexical item from the one or more first lexical items based on a first score associated with each of the one or more first lexical items; and providing the first lexical item for display on a user device. Other embodiments of this aspect include corresponding systems, apparatus, and computer program products.

These and other embodiments can optionally include one or more of the following features. The first grapheme represents only a portion of a syllable in the second writing system. The method can further include receiving a second grapheme in the first writing system; using the grapheme graph of graphemes in the first writing system to identify a second n-gram representation in the first writing system of a second morpheme in the second writing system, where the second n-gram representation includes the second grapheme; using the second n-gram representation to locate one or more second nodes in the morpheme graph, where each located second node in the morpheme graph represents one or more second lexical items in the second writing system, each of the one or more second lexical items represented by the second n-gram representation; generating one or more permutations of a third lexical item and a fourth lexical item, where the third lexical item is selected from the one or more first lexical items, and the fourth lexical item is selected from the one or more second lexical items; selecting a permutation from the one or more permutations, based on a second score associated with each of the one or more permutations, where the selected permutation includes the third lexical item followed by the fourth lexical item; comparing the first score of the selected first lexical item and the second score of the selected permutation; and providing the selected first lexical item or the selected permutation for display on the user device based on the comparison.

The first grapheme represents only a portion of a third morpheme that is different from a fourth morpheme represented only in part by the second grapheme. The grapheme graph includes a plurality of nodes, each node representing a grapheme in the first writing system, and where each node in a proper subset of the plurality of nodes corresponds to a full syllable, each corresponding full syllable including the graphemes of its corresponding node and of the nodes from which the corresponding node descends. The first n-gram representation represents a full syllable that corresponds to one of the nodes in the proper subset of nodes. The morpheme graph includes a plurality of nodes, each node representing one or more morphemes in the second writing system, and where each node in a proper subset of the plurality of nodes corresponds to a lexical item, each corresponding lexical item including the morphemes of its corresponding node and of the nodes from which the corresponding node descends.

The morpheme corresponds to a Hanzi character. The first n-gram representation is representative of a full Pinyin syllable and each of the one or more lexical items is a Hanzi term. Using the first n-gram representation to locate one or more nodes in a morpheme graph includes: selecting an identifier of a first node in the grapheme graph that corresponds to the first n-gram representation; and locating a second node in the morpheme graph that is associated with the identifier.

In general, another aspect of the subject matter described in this specification can be embodied in methods that include the actions of receiving a first Roman character input; using the first Roman character input to locate a first Pinyin syllable node in a Pinyin input graph, the Pinyin input graph including a plurality of Pinyin syllable nodes, each Pinyin syllable node corresponding to a Roman character, where each Pinyin syllable node in a proper subset of the plurality of Pinyin syllable nodes corresponds to a Pinyin syllable, each corresponding Pinyin syllable including the Roman characters of its corresponding Pinyin syllable node and the Pinyin syllable nodes from which the corresponding Pinyin syllable node descends;

using the located Pinyin syllable node to locate one or more first Hanzi character nodes in a Pinyin syllable graph, the Pinyin syllable graph including a plurality of Hanzi character nodes, each Hanzi character node corresponding to a Pinyin syllable, where each Hanzi character node in a proper subset of the plurality of Hanzi character nodes corresponds to one or more first Hanzi terms, each corresponding one or more first Hanzi terms including Hanzi characters that correspond to Pinyin syllables of its corresponding Hanzi character node and the Hanzi character nodes from which the corresponding Hanzi character node descends; and selecting a first Hanzi term corresponding one of the one or more Hanzi character nodes based on a first score associated with each of the one or more first Hanzi terms for output to a user device. Other embodiments of this aspect include corresponding systems, apparatus, and computer program products.

These and other embodiments can optionally include one or more of the following features. The method can further include receiving a second Roman character input; using the second Roman character input to locate a second Pinyin syllable node in the Pinyin input graph, where the second Pinyin syllable node represents a Pinyin syllable that includes the second Roman character input; using the second located Pinyin syllable node to locate one or more second Hanzi character nodes in the Pinyin syllable graph, where each located second Hanzi character node corresponds to one or more second Hanzi terms; and generating one or more permutations of a third Hanzi term and a fourth Hanzi term, where the third Hanzi term is selected from the one or more first Hanzi terms, and the fourth Hanzi term is selected from the one or more second Hanzi items; selecting a permutation from the one or more permutations, based on a second score associated with each of the one or more permutations, where the selected permutation includes the third Hanzi term followed by the fourth Hanzi term; comparing the first score of the selected first Hanzi term and the second score of the selected permutation; and providing the selected first Hanzi term or the selected permutation for output to the user device based on the comparison.

Using the located Pinyin syllable node to locate one or more Hanzi character nodes includes: selecting an identifier of the located Pinyin syllable node; and locating a first Hanzi character node in the Pinyin syllable graph that is associated with the identifier. The Pinyin syllable graph is a Patricia trie.

In general, another aspect of the subject matter described in this specification can be embodied in systems that include a data processing apparatus; and a data store, in which is stored: a grapheme graph of graphemes in a first writing system, the grapheme graph including a first plurality of nodes, each node in the first plurality of nodes representing a grapheme in the first writing system, and where each node in a proper subset of the first plurality of nodes corresponds to a full syllable, each corresponding full syllable including the graphemes of its corresponding node in the first plurality of nodes and of the nodes from which the corresponding node in the first plurality of nodes descends; and a morpheme graph of morphemes in a second writing system, the morpheme graph including a second plurality of nodes, each node in the second plurality of nodes representing one or more morphemes in the second writing system, and where each node in a proper subset of the second plurality of nodes corresponds to a lexical item, each corresponding lexical item including the morphemes of its corresponding node in the second plurality of nodes and of the nodes from which the corresponding node in the second plurality of nodes descends. Other embodiments of this aspect include corresponding methods, apparatus, and computer program products.

These and other embodiments can optionally include one or more of the following features. The data store further stores: a language model that scores combinations of one or more of the lexical items.

Particular embodiments of the subject matter described in this specification can be implemented to realize one or more of the following advantages. Using a grapheme graph and a morpheme graph to parse an input in a first writing system to identify corresponding lexical items in a second writing system expands a search space of possible lexical items, thereby increasing a number of candidate lexical items considered and increasing accuracy and recall. In addition, using a grapheme graph and a morpheme graph to parse an input in a first writing system to identify corresponding lexical items in a second writing system decreases a number of tokens (e.g., characters) of input needed to identify candidate lexical items, thereby increasing a convenience and efficiency of an input method and improving a user's experience.

Reducing the number of tokens of input needed to identify candidate lexical items can be especially useful on mobile devices (e.g., mobile phones) that include smaller keypads or predictive keyboards. In addition, an input method editor that can parse all the input text (e.g., an entire Pinyin input string) reduces an amount of user input and interaction needed to provide an output candidate for the input text, thereby further increasing a convenience and efficiency of an input method and improving a user's experience. For example, a user does not need to input each Pinyin syllable and separately select an output candidate for each Pinyin syllable.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1F include example text input in a first writing system and example output text candidates in a second writing system.

Like reference numbers and designations in the various drawings indicate like elements.

DETAILED DESCRIPTION

Overview

Figure 2:
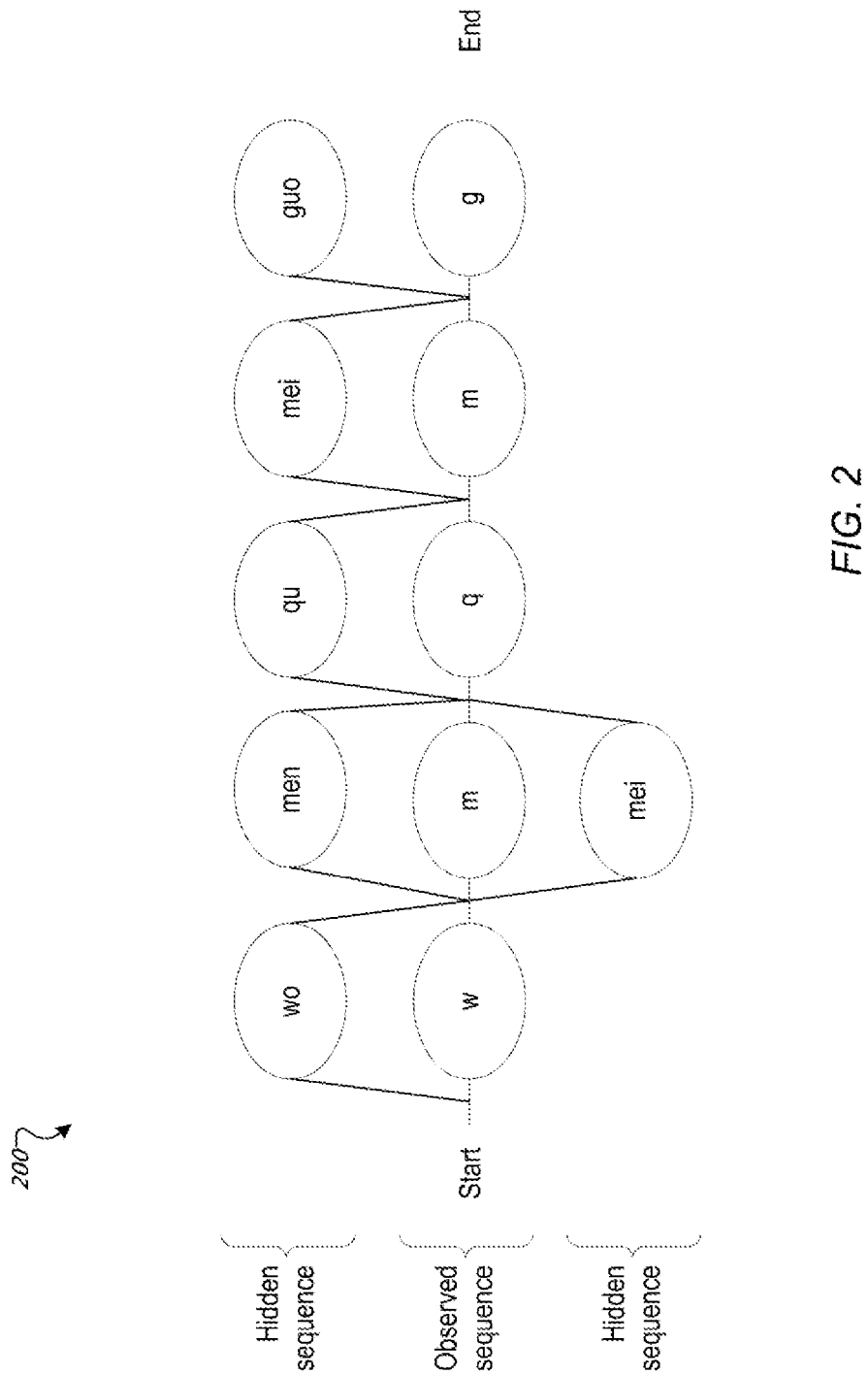
FIG. 2 is a block diagram illustrating an observed sequence of text input and potential sequences of syllables that are represented by the observed sequence of text input.

FIGS. 1A-1F include example text input in a first writing system and example output text candidates in a second writing system. FIGS. 1A-1F include example text input in the first writing system, e.g., Pinyin. FIGS. 1C, 1D, and 1F also include example output text candidates in a second writing system, e.g., Hanzi. The example text input and example output text candidates included in FIGS. 1A-1F include delimiters (e.g., spaces) between some of the Roman and Hanzi characters. The inclusion of these delimiters makes the examples easier to understand, and delimiters may not actually be included in practice, e.g., during input of the Roman characters, a user may not separate the Roman characters using spaces.

As an example, a user may want to input a Chinese sentence "我們去美國" (e.g., "We are going to America" in English) by entering Roman characters into an input method editor (IME). The input Roman characters entered by the user can be used to represent Pinyin, a first writing system. The user may desire that the IME provide an output in Hanzi, a second writing system. A full Pinyin representation of the Chinese sentence "我 們去美國" would be "wǒ men qù měi guó". It may be inconvenient for a user to enter the full Pinyin representation, e.g., especially on a mobile device (e.g., a mobile phone).

Therefore, a user may want to input a number of characters that are less than the full Pinyin representation (e.g., an abbreviation). FIG. 1A shows example input text that includes the Roman characters "w", "m", "q", "m", and "g". In order to identify potential Hanzi characters that correspond to the example input text in FIG. 1A, an input method editor can map the example input text to potential full Pinyin representations. Ideally, the input method editor would map the example input text "w m q m g" to the full Pinyin representation "women qu mei guo".

The task of identifying the full Pinyin representation presents two initial problems. Assuming that segmentations of the Roman characters into Pinyin syllables are known, as shown in FIGS. 1A-1D and 1F, one problem is determining a Pinyin syllable that a user intended that the segmented group of Roman characters represent. This problem can be illustrated with reference to FIGS. 1B-1D. FIG. 1B shows example input text that includes the Roman characters "w", "o", "m", "q", "u", "m", "e", "i", "g", "u", "o". Although the example input text in FIG. 1B "wo m qu mei guo" includes more characters (in order) that match the full Pinyin representation "wo men qu mei guo" than in FIG. 1A, "wo m qu mei guo" can still represent two or more full Pinyin representations, as illustrated in FIGS. 1C and 1D.

FIG. 1C shows a full Pinyin representation of the Chinese sentence "我們去美國", and FIG. 1D shows a full Pinyin representation of the Chinese sentence " 我沒去美國 " (e.g., "I've never went to America" in English). In FIGS. 1C and 1D, "wo" corresponds to "我", "qu" corresponds to "去", "mei" corresponds to " 美 ", and "guo" corresponds to "國". FIGS. 1C and 1D can be used to illustrate that the user may have intended that the first occurrence of the character "m" (after the characters "wo") represent either the Pinyin syllable "men" that can correspond to " 們 " or the Pinyin syllable "mei" that can correspond to "沒".

Another problem is determining whether or not each Roman character input represents a different Pinyin syllable (or Hanzi character). As described previously, each Pinyin syllable (e.g., a full Pinyin syllable) corresponds to a Hanzi character. This problem can be illustrated using FIGS. 1D-1F. Again, FIG. 1D assumes that the example input text is segmented such that "wo", "mei", "qu", "mei", "guo" each represent a Pinyin syllable. FIG. 1E shows the same sequence of example input text as in FIG. 1D, but un-segmented.

The example input text in FIG. 1E "w o m e i q u m e i g u o" can represent the sequence of Pinyin syllables shown in FIG. 1D or the sequence of Pinyin syllables in FIG. 1F. In particular, the sequence of characters "g", "u", and "o" can represent a single Pinyin syllable "guo" as shown in FIG. 1D, or two Pinyin syllables "gu" and "o" as shown in FIG. 1F. In the second example, "gu" represents a first Pinyin syllable, and "o" a second Pinyin syllable. FIG. 1F shows that the user may have intended to input the sentence "我妹去梅谷 哦 " (e.g., "My younger sister will go to Plum Valley" in English). In addition, FIG. 1F shows that "mei" can correspond to other Hanzi characters such as " 妹 " and "梅".

FIG. 2 is a block diagram 200 illustrating an observed sequence of text input and potential sequences (e.g., hidden sequences in a hidden Markov model) of syllables that are represented by the observed sequence of text input. In particular, FIG. 2 shows the potential sequences of syllables illustrated in FIGS. 1C and 1D. The observed sequence of text input "w m q m g" can represent either "wo men qu mei guo" or "wo mei qu mei guo". Other potential sequences of syllables are possible (and not shown). For example, as illustrated with reference to FIG. 1F, the observed sequence of text input "w m q m g" can also represent "wo mei qu mei gu o".

When a text input is received in a first writing system (e.g., Pinyin), the two initial problems described above can be addressed by: (i) identifying n-gram representations in the first writing system (e.g., Pinyin syllables) based on the text input in the first writing system, and (ii) identifying morphemes (e.g., Hanzi characters) and lexical items (e.g., Hanzi terms) in the second writing system based on the identified n-gram representations. Ideally, the most likely morphemes that represent the user's desired input are identified.

Example Grapheme Graph

A grapheme graph can be used to identify n-gram representations in a first writing system represented by the input text in the first writing system.

An n-gram is a sequence of n consecutive tokens, e.g., characters or words. An n-gram has an order, which is a number of tokens in the n-gram. For example, a 1-gram (or unigram) includes one token; a 2-gram (or bi-gram) includes two tokens. As an example, "wo" can be a 2-gram representation in a first writing system (e.g., a Pinyin syllable) of a morpheme in a second writing system (e.g., " 我 " pronounced "wǒ", " 臥 " pronounced "wǒ"). As another example, "m" can be a 1-gram representation in the first writing system of a morpheme in a second writing system (e.g., " 們 " pronounced "men", " 沒 " pronounced "méi"). In these examples, the first writing system is Pinyin and the second writing system is Hanzi.

Temporarily returning to the example in FIG. 1C, the Chinese sentence "我們去美 國 " can be segmented into the unigrams, e.g., words, "我們" (e.g., "we" in English), "去" (e.g., "went" in English), and "美國" (e.g., "America" in English). Example bi-grams are "我" "們, 去" and "去, 美國". In this example, the tokens in the bi-gram are separated by a comma.

Figure 3:
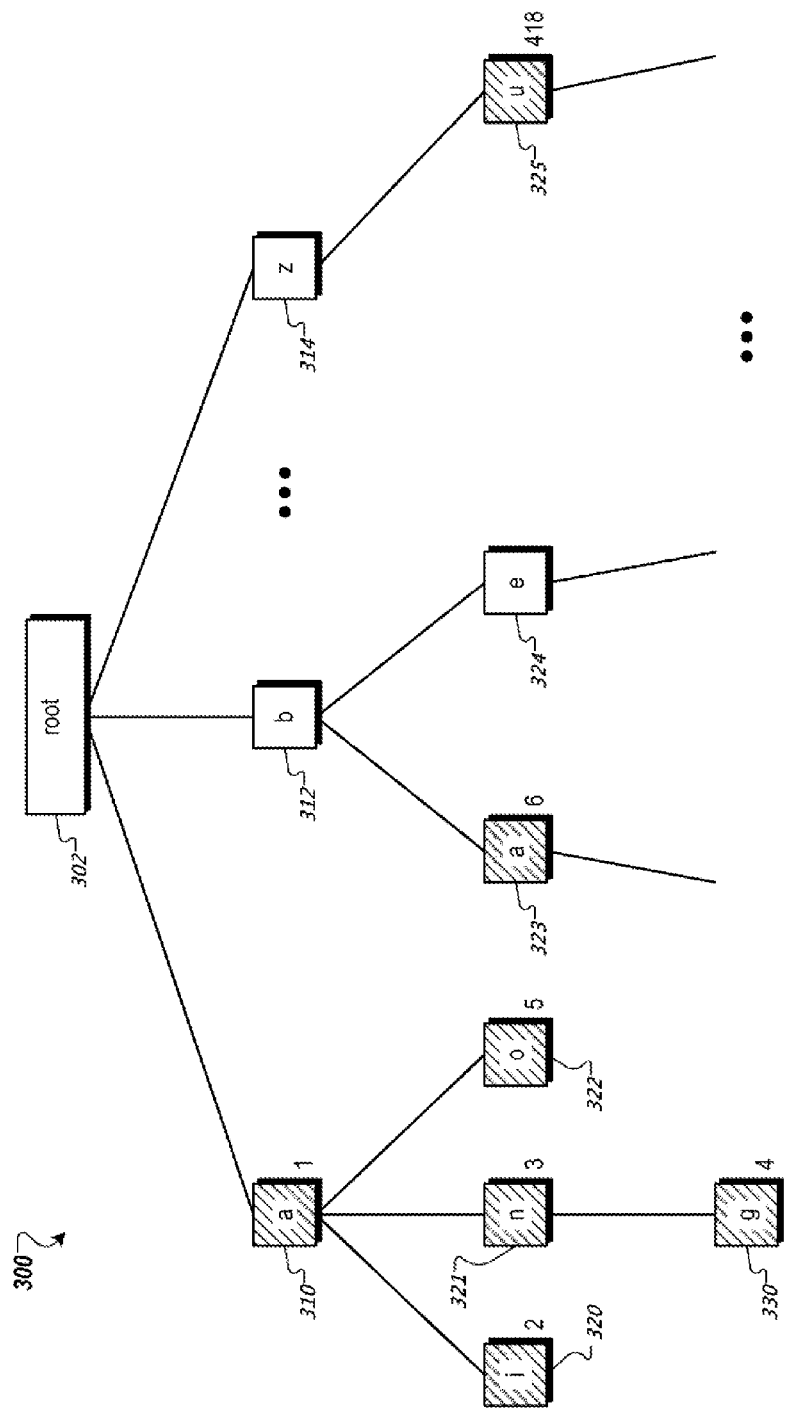
FIG. 3 shows an example grapheme graph.

FIG. 3 shows an example grapheme graph 300. In particular, the grapheme graph 300 (e.g., a Pinyin input graph) is a trie that includes one or more nodes (e.g., Pinyin syllable nodes), e.g., a root node 302 and one or more child nodes. Each node, except the root node, represents a grapheme (e.g., a Roman character) in a first writing system (e.g., Pinyin). The nodes can be classified into levels. For example, a root level can include the root node 302. A first level can include direct child nodes of root node 302, e.g., nodes 310, 312, and 314. Each of the nodes 310, 312, and 314 in the first level represents a grapheme that is a first sub-syllable (e.g., a prefix). For example, nodes 310, 312, and 314 represent a first Roman character that begins a Pinyin syllable. The grapheme graph 300 can be traversed from the root node 302 to its child nodes to identify n-gram representations in the first writing system (e.g., Pinyin syllables) of morphemes in a second writing system (e.g., Hanzi characters).

Each node in the grapheme graph 300 also corresponds to an n-gram representation including the graphemes of its corresponding node and of the nodes from which the corresponding node descends. For example, node 310 corresponds to an n-gram representation "a". Node 324 corresponds to an n-gram representation "be", and node 330 corresponds to an n-gram representation "ang".

In addition, a proper subset of the nodes in grapheme graph 300 corresponds to a full syllable (e.g., a Pinyin syllable) that correspond to a morpheme in the second writing system. In particular, nodes 310 ("a"), 320 ("ai"), 321 ("an"), 322 ("ao"), 323 ("ba"), 325 ("zu"), and 330 ("ang") correspond to full syllables. This proper subset is indicated in the visual representation of the grapheme graph 300 by the shaded nodes. Alternatively, the unshaded nodes correspond to only a portion of a syllable. For example, nodes 312 ("b"), 314 ("z"), and 324 ("be") correspond to only a portion of a Pinyin syllable (e.g., a sub-syllable). Because the unshaded nodes correspond to only a portion of a Pinyin syllable, they do not correspond to a morpheme in the second writing system.

Each node in the proper subset of nodes (i.e., the shaded nodes) is also associated with an identifier. For example, node 310 is associated with identifier "1", node 320 is associated with identifier "2", node 321 is associated with identifier "3", node 322 is associated with identifier "5", node 323 is associated with identifier "6", node 325 is associated with identifier "418", and node 330 is associated with identifier "4". Identifiers can be numbers or any other combinations of characters (e.g., alphanumeric string).

Figure 4:
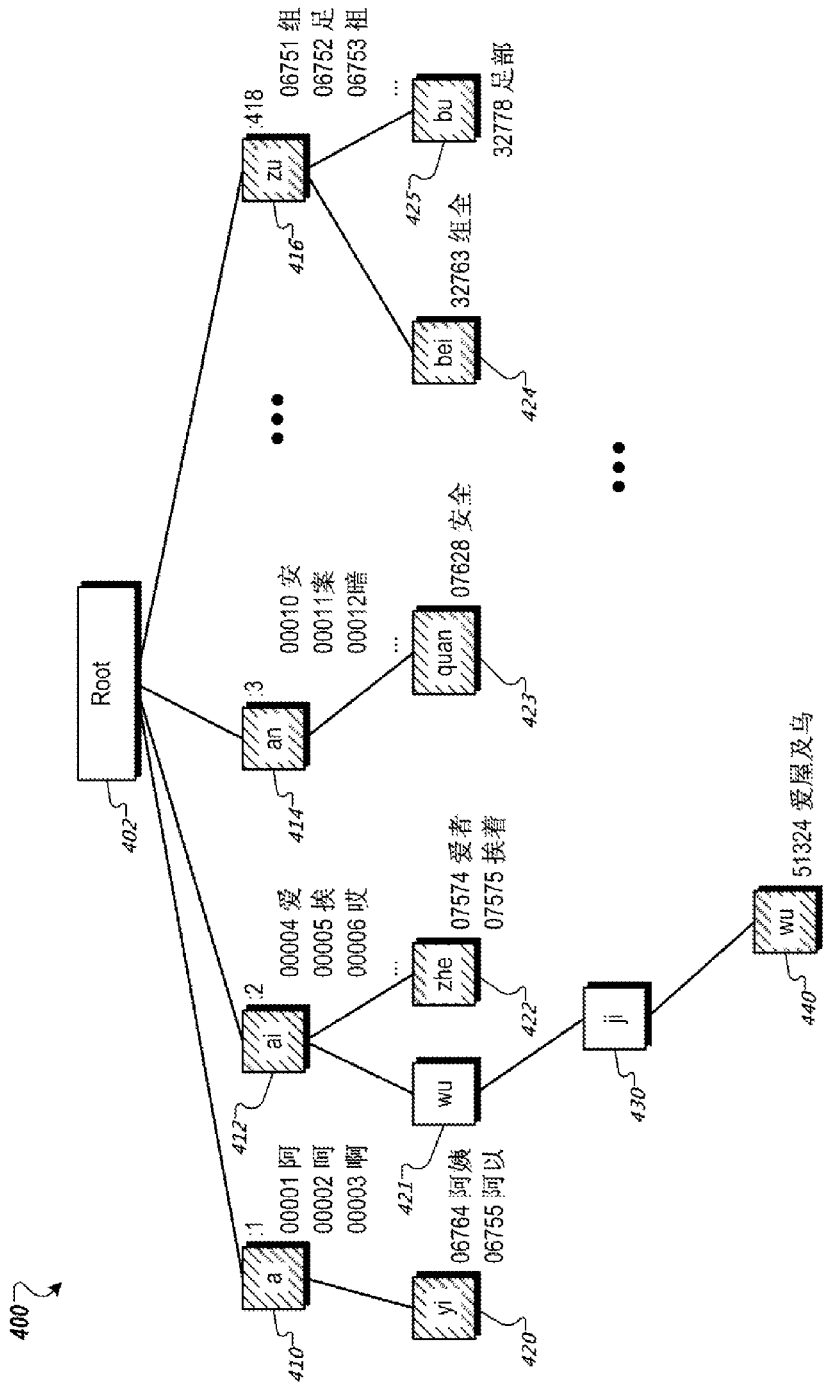
FIG. 4 shows an example morpheme graph.

Each identifier can be used to locate nodes in a morpheme graph, as will be described in further detail below. Temporarily referring to FIG. 4, as a brief overview, a morpheme graph 400 includes nodes that each correspond to one or more morphemes in the second writing system (e.g., Hanzi characters). A proper subset of the one or more nodes in the morpheme graph 400 corresponds to lexical items in the second writing system (e.g., Hanzi terms). An identifier selected from the grapheme graph 300 can be used to traverse the morpheme graph 400, e.g., by locating nodes in the morpheme graph 400 that are associated with the identifier. For example, node 410 is also associated with identifier "1", node 412 is also associated with identifier "2", node 414 is also associated with identifier "3", and node 416 is also associated with identifier "418". In FIG. 4, identifiers are only illustrated for nodes in the first level, but in practice, an identifier is associated with each shaded node.

Returning to FIG. 3, as each grapheme (e.g., Roman character) is received by an input method editor, the grapheme graph 300 can be used to identify possible n-gram representations in the first writing system. For example, if the Roman character "b" is received, node 312 can be located. As another example, the Roman character "a" can be received after "b". In other words, the input sequence can be "ba". Thus, node 323 can be located for "ba", and nodes 310, 320, 321, 322, and 330 can be located for the remaining Pinyin syllables beginning with "a". In particular, the input sequence "ba" can represent a Pinyin syllable "ba", a Pinyin syllable beginning with "ba", or a Pinyin syllable beginning with "b" and a Pinyin syllable beginning with "a".

In some implementations, after possible n-gram representations are identified by locating shaded nodes represented by the input sequence, associated identifiers for the located shaded nodes can be returned. As described previously, these identifiers can be used to locate nodes in a morpheme graph to identify lexical items.

Other implementations are possible. For example, the grapheme graph 300 is a Patricie trie, but the grapheme graph 300 can be implemented in other types of data structures (e.g., hash tables, balanced tries). In addition, in some implementations, n-gram representations are returned in place of or in combination with the identifiers. Furthermore, the grapheme graph 300 can be implemented to represent different combinations of writing systems. For example, the first writing system can be Bopomofo, and the second writing system can be Hanzi. As another example, the first writing system can be Romaji (e.g., Romanization of Japanese), and the second writing system can be Kanji-Japanese.

Example Morpheme Graph

FIG. 4 shows an example morpheme graph 400. In particular, the morpheme graph 400 (e.g., a Pinyin syllable graph) is a trie that includes one or more nodes (e.g., Hanzi character nodes), e.g., a root node 402 and one or more child nodes. The nodes can be classified into levels. For example, a root level can include the root node 402. A first level can include direct child nodes of the root node 402, e.g., nodes 410, 412, 414, and 416. Nodes 410, 412, 414, and 416 in the first level represent a prefix of a lexical item. For example, nodes 410, 412, 414, and 416 in the first level represent a first Hanzi character that begins a Hanzi term (e.g., a word or phrase). The morpheme graph 400 can be traversed from the root node 402 to child nodes to identify lexical items in the second writing system based on the n-gram representations identified using the grapheme graph 300.

Each node in the morpheme graph 400 represents one or more morphemes in the second writing system. For example, node 410 represents morphemes "阿", "呵", and "啊", each of which can be pronounced in multiple forms (e.g., "a", "ā", "à"). As another example, node 421 can represent "屋" (not shown). In addition, a proper subset of the nodes in morpheme graph 400 correspond to lexical items (e.g., Hanzi terms). For example, nodes 410, 412, 414, 416, 420, 422, 423, 424, 425, and 440 correspond to lexical items. This proper subset is indicated in the visual representation of the morpheme graph 400 by the shaded nodes. Alternatively, the unshaded nodes correspond to only a portion of a lexical item. For example, nodes 421 and 430 correspond to only a portion of a lexical item. In particular, node 421 can correspond to "爱屋", which is only a portion of a lexical item (e.g., a portion of the Chinese idiom "爱屋及乌" that corresponds to node 440).

Each corresponding lexical item includes the morpheme of its corresponding node and of the nodes from which the corresponding node descends. For example, node 420 descends from node 410. Node 420 corresponds to lexical items "阿姨" and "阿以". "姨" and "以" are morphemes that correspond to the Pinyin syllable "yi", and "阿" corresponds to node 410.

Although the nodes in the morpheme graph 400 are labeled with n-gram representations in the first writing system (e.g., node 410 is labeled with "a", and node 430 is labeled with "ji"), in practice, the nodes are associated with identifiers (e.g., the same identifiers from the grapheme graph 300). For example, as described previously, node 410 is associated with identifier "1", and node 416 is labeled with identifier "418". In addition, the nodes in the morpheme graph also are associated with lexical item identifiers that identify the corresponding lexical items (e.g., "32778" for "足部" in node 425).

In some implementations, the lexical items (e.g., Hanzi terms) are stored in a data structure that is separate from the morpheme graph 400. In these and other implementations, each node of the morpheme graph is only associated with the identifiers from the grapheme graph and the lexical item identifiers. For example, the lexical items can be stored in a dictionary indexed by the lexical item identifiers. Located nodes (e.g., shaded nodes) in the morpheme graph provide lexical item identifiers that can be used to identify lexical items in the dictionary.

Figure 5:
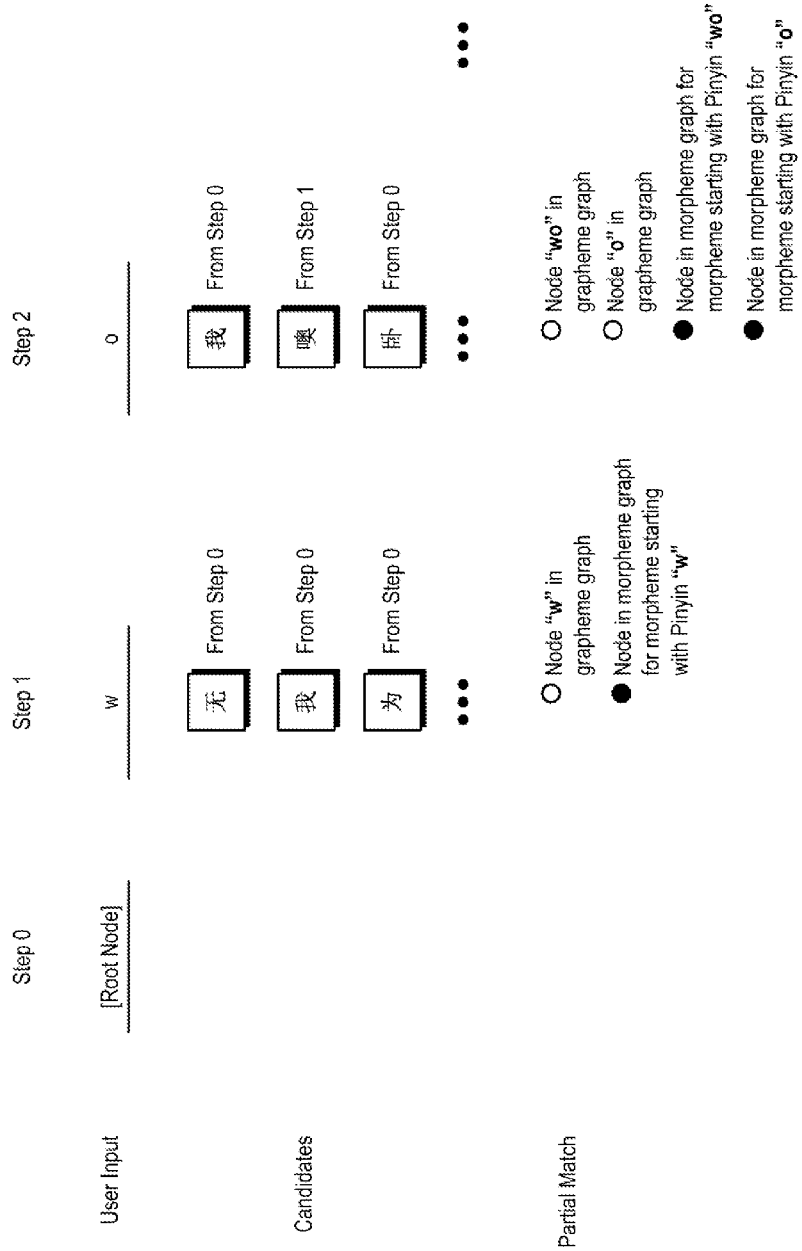
FIG. 5 illustrates steps of an example use of the grapheme graph and morpheme graph.

Permutations of n-gram representations of an input sequence in a first writing system identified using the grapheme graph 300 are used to traverse the morpheme graph to identify possible lexical items, as illustrated in the example in FIG. 5.

FIG. 5 illustrates steps of an example use of the grapheme graph and morpheme graph. At Step 0, no input has been received, and no child nodes in the grapheme graph and morpheme graph have been located.

In Step 1, a Roman character "w" is received by an input method editor. In response, the input method editor locates a node representing "w" in the first level of a grapheme graph. The input method editor also locates all nodes that descend from the node representing "w" and that are in a proper subset of the nodes in grapheme graph that corresponds to a full syllable (e.g., that correspond to a morpheme in the second writing system). Identifiers associated with the located nodes can be used to locate nodes in a morpheme graph that represent Hanzi characters. For example, "w" is the first sub-syllable of Pinyin syllables "wu", "wo", and "wei". Referring to Step 1 in FIG. 5, "无" corresponds to "wú", "我" corresponds to "wǒ", and "为" corresponds to "wèi". In Step 1, only three Pinyin characters are shown in the example, e.g., where "无", "我", and "为" may be the most likely candidates for "w". Similarly, Step 2 only shows some of the possible candidates that are processed in response to receiving the Roman characters "w" and "o". FIG. 5 does not show all possible candidates that are processed in practice.

In Step 2, a Roman character "o" is received by the input method editor after receipt of the Roman character "w". In addition to locating the node representing "w" in the first level of the grapheme graph, the input method editor also locates a node representing "o" in the first level of the grapheme graph. As described previously, "w" can be a first sub-syllable of a full Pinyin syllable, "o" can be the first sub-syllable of the full Pinyin syllable, or "wo" can be a full Pinyin syllable. The input method editor also locates all nodes that descend from the node representing "w" and "o" that are in a proper subset of the nodes in grapheme graph that corresponds to a full Pinyin syllable. Identifiers associated with the located nodes can be used to locate nodes in a morpheme graph that represent Hanzi characters that represent the full syllable. For example, "w" is the first-sub syllable of Pinyin syllable "wo". Referring to Step 2 in FIG. 5, "我" corresponds to "wǒ" and "卧" corresponds to "wǒ". As another example "o" is a full Pinyin syllable; "噢" corresponds to "ō".

Scoring

Possible permutations of lexical items that are represented by the input text are identified using a grapheme graph and morpheme graph, as described above. For example, returning to FIG. 5, Step 1 shows first lexical items "无", "我", and "为" that may be represented by the Roman character "w". After receiving only a first grapheme (e.g., "w"), one of the first lexical items, e.g., "无", "我", and "为", can be selected based on a score associated with each of the first lexical items. For example, the lexical item that is most likely to occur can be selected (and displayed).

As described previously, when additional graphemes are received as input (e.g., a second grapheme), the first grapheme and second grapheme can represent one of the one or more first lexical items, or the first grapheme and the second grapheme can each represent a different lexical item, e.g., the second grapheme can represent a lexical item from a group of one or more second lexical items. To address these cases, permutations of third lexical items and fourth lexical items can be generated and scored. Third lexical items can be selected from the one or more first lexical items, and fourth lexical items can be selected from the one or more second lexical items. The scores of the first lexical items and the scores of the permutations can be compared to provide the most likely lexical item.

For example, in FIG. 5, scores for first lexical items "无" ("wú"), "我" ("wǒ"), and "为" ("wèi") can an be identified, or calculated. In addition, scores for permutations "无噢" ("wú ō"), "我噢" ("wǒ ō"), and "为噢" ("wèi ō") can be identified. Again, this example does not illustrate all possible first lexical items and permutations that would be processed in practice. The identified scores can be compared to provide, for example, the lexical item or permutation with the highest score for display.

In some implementations, the possible permutations are sent to an n-gram language model to calculate the likelihoods of the permutations occurring, and one or more permutation can be selected based on one or more criteria. For example, the permutation that is most likely to occur can be selected.

The probability according to an n-gram language model that a particular string (e.g., permutation of lexical items) will occur can be determined using the chain rule. The chain rule determines a probability of a string as a product of individual probabilities. Thus, for a given string "$e_1, e_2, \ldots e_k$", the probability for the string, $p(e_1, e_2, \ldots e_k)$, is equal to:

$$\prod_{i=1}^{k} p(e_i | e_1, \ldots, e_{i-1}).$$

The n-gram language model can be limited to a particular maximum size n-gram, e.g., limited to 1-grams, 2-grams, 3-grams, etc. For example, for a given string "NASA officials say they hope," where the maximum n-gram order is limited to 3-grams, the probability for the string can be determined as a product of conditional probabilities as follows: p(NASA officials say they hope)=p(NASA)·p(officials|NASA)·p(say|NASA officials)·p(they|officials say)·p(hope|say they). This can be generalized to:

$$p(e_1, \ldots, e_k) = \prod_{i=1}^{k} p(e_i \mid e_{i-n+1}, \ldots, e_{i-1}),$$

where n is the order of the largest n-gram allowed in the language model.

The conditional probabilities are generally determined empirically, according to relative frequencies in the documents of training data. For example, in the example above, the probability of the word "say" given the context of "NASA officials" is given by:

$$p(\text{say} \mid \text{NASA officials}) = \frac{f(\text{NASA officials say})}{f(\text{NASA officials})},$$

where f (NASA officials say) is a frequency or a count of the occurrences of the string "NASA officials say" in the documents of the training data. Conditional probabilities for strings within the maximum n-gram order in the n-gram language model correspond to the probability stored in the language model for the n-gram, e.g., p(say|NASA officials) is the conditional probability stored in the language model for the 3-gram entry "NASA officials say".

Similarly, conditional probabilities can be calculated for other writing systems. Temporarily returning to the example in FIG. 1C, p(去 | 我們) is the conditional probability stored in the language model for the 2-gram entry "我們, 去", and p(美國 | 我們, 去), is the conditional probability stored in the language model for the 3-gram entry "我們, 去, 美國". In the examples, tokens (e.g., words) in the n-grams are separated by commas.

In some implementations, scores of each of the permutations are compared and the permutation that is most likely to occur is presented to a user (e.g., on a user device). In some implementations, if the permutation presented to the user is not correct, the user can identify (e.g., select) correct morphemes from the beginning of the presented permutation, and the input method editor can generate another permutation for display. For example, returning to FIGS. 1B-1D, a user may provide as input "wo m qu mei guo". The input method editor may display "我們去美國" as the most likely permutation. However, the user may have intended to enter "我沒去美國". The user can select only "我". In response, the input method editor can determine that "我" was identified from "wo" in the grapheme graph and morpheme graph, and display additional candidates that were previously identified using the grapheme graph and morpheme graph based on the partial string "m qu mei guo". For example, the input method editor can display "沒去美國" (e.g., "never went to America" in English) and "媽媽去美國" (e.g., "mother is going to America" in English). "媽媽" corresponds to the Pinyin syllables "mā ma". Other implementations are possible. For example, a user can identify any of the morphemes in the presented permutation as correct.

Example System

Figure 6:
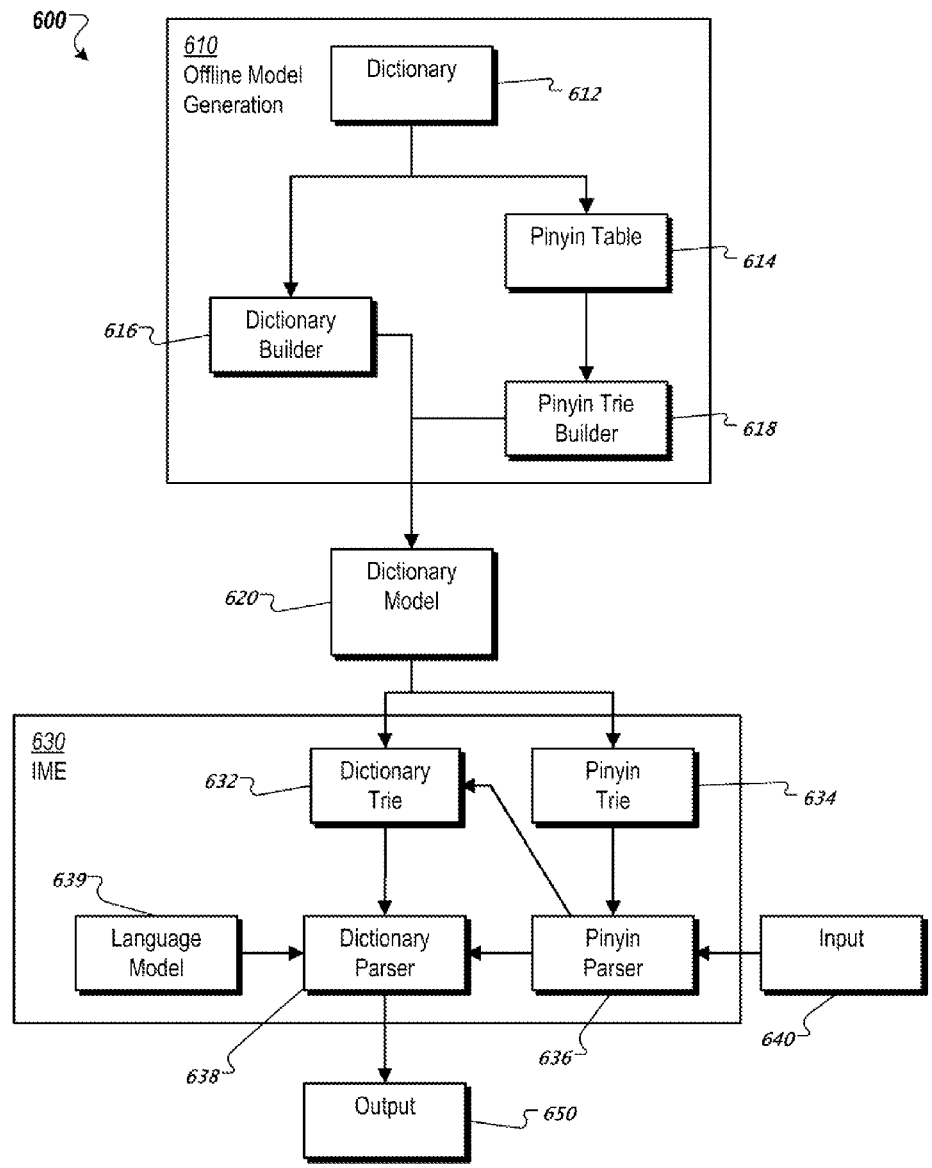
FIG. 6 is a block diagram of an example system for generating output text candidates in a second writing system based on text input in a first writing system.

FIG. 6 is a block diagram of an example system 600 for generating output text candidates in a second writing system based on text input in a first writing system. The system 600 includes an offline generation model 610. The offline generation model 610 can generate a dictionary 612 from training data (not shown). Examples of training data include web pages, instant message logs, news, and other sources of text. The dictionary 612 can include Hanzi characters, associated Pinyin syllables, and associated scores (e.g., frequencies of the Hanzi characters occurring in the training data). The dictionary 612 can be parsed to produce a Pinyin table 614 that includes the Pinyin syllables and associated scores. The dictionary 612 can be parsed by a dictionary builder 616 and the Pinyin table 614 by a Pinyin trie builder 618 to generate a dictionary model 620 that includes Pinyin syllables, associated Hanzi characters, and identifiers for each.

The dictionary model 620 can be used by an IME 630 to generate a dictionary trie 632 (e.g., morpheme graph 400) and a Pinyin trie 634 (e.g., grapheme graph 300). When input 640 (e.g., user input) is received, a Pinyin parser 636 and dictionary parser 638 can process the input using the dictionary trie 632 and Pinyin trie 634, as described with reference to FIGS. 1-5 above. The IME 630 can then use a language model 639 to identify a most likely permutation of lexical items and provide the most likely permutation as output 650 for display on a user device.

Figure 9:
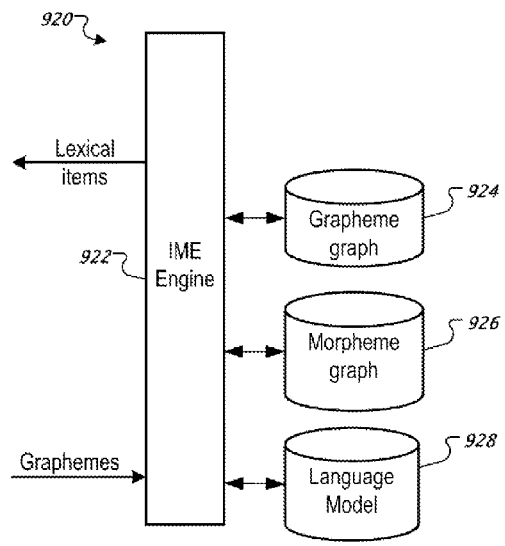
FIG. 9 is a block diagram of an example input method editor.

The components of system 600 can be communicatively coupled to one or more of each other. Though the components identified above are described as being separate or distinct, one or more of the components may be combined in a single process or routine. The functional description provided herein including separation of responsibility for distinct functions is by way of example. Other groupings or other divisions of functional responsibilities can be made as necessary or in accordance with design preferences. For example, a single parser could perform the functions of the Pinyin parser 636 and the dictionary parser 638. As another example, the dictionary trie 632, Pinyin trie 634, and language model 639 can be distinct from the IME (e.g., as shown in FIG. 9).

Example Processes

Figure 7A:
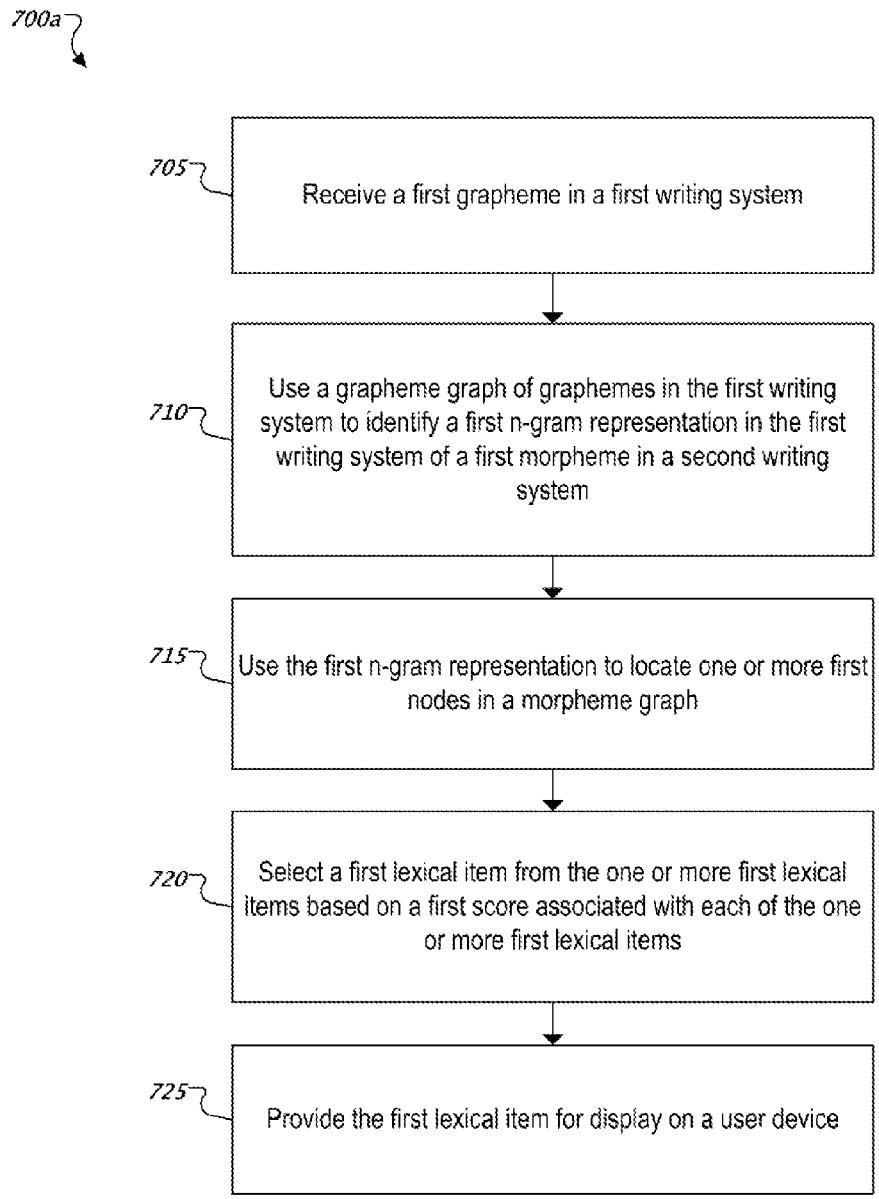
FIG. 7A is a flow chart showing an example process for generating output text candidates in a second writing system based on text input in a first writing system.

FIG. 7A is a flow chart showing an example process 700a for generating output text candidates in a second writing system based on text input in a first writing system. The process 700a includes receiving a first grapheme in a first writing system (705). For example, the IME 630 can receive the first grapheme (e.g., input 640).

The process 700a also includes using a grapheme graph of graphemes in the first writing system to identify a first n-gram representation in the first writing system of a first morpheme in a second writing system (710). The first n-gram representation includes the first grapheme. For example, the Pinyin parser 636 can use a grapheme graph (e.g., Pinyin trie 634) to identify a first n-gram representation in the first writing system (e.g., Pinyin syllable) of a first morpheme in a second writing system (e.g., Hanzi character). The process 700a also includes using the first n-gram representation to locate one or more first nodes in a morpheme graph (715). Each located first node in the morpheme graph represents one or more first lexical items in the second writing system, and each of the one or more first lexical items is represented by the first n-gram representation. For example, the dictionary parser 638 can use the first n-gram representation to locate one or more first nodes in a morpheme graph (e.g., dictionary trie 632).

The process 700a also includes selecting a first lexical item from the one or more first lexical items based on a first score associated with each of the one or more first lexical items (720). For example, the dictionary parser 638 can select a first lexical item based on a first score associated with each of the one or more first lexical items (e.g., identified using the language model 639).

The process 700a also includes providing the first lexical item for display on a user device (725). For example, the IME 630 can provide the first lexical item for display on a user device (e.g., a mobile phone).

Figure 7B:
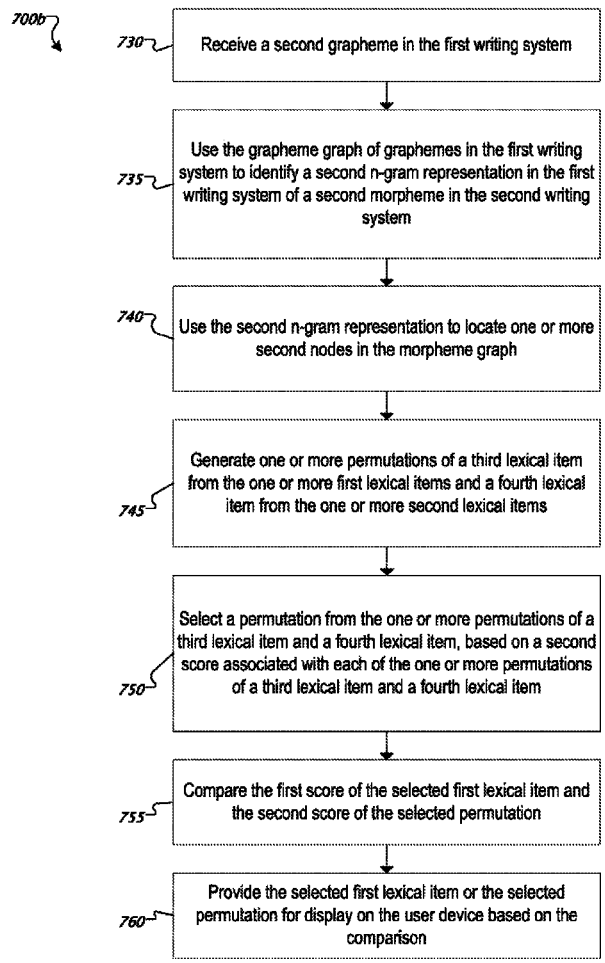
FIG. 7B is a flow chart showing another example process for generating output text candidates in a second writing system based on text input in a first writing system.

FIG. 7B is a flow chart showing another example process 700b for generating output text candidates in a second writing system based on text input in a first writing system. In some implementations, process 700b is performed after process 700a.

The process 700b includes receiving a second grapheme in the first writing system (730). For example, the IME 630 can receive the second grapheme (e.g., input 640). The process 700b also includes using the grapheme graph of graphemes in the first writing system to identify a second n-gram representation in the first writing system of a second morpheme in the second writing system (735). The second n-gram representation includes the second grapheme. For example, the Pinyin parser 636 can use the grapheme graph (e.g., Pinyin trie 634) to identify a second n-gram representation in the first writing system.

The process 700b also includes using the second n-gram representation to locate one or more second nodes in the morpheme graph (740). Each located second node in the morpheme graph represents one or more second lexical items in the second writing system, and each of the one or more second lexical items is represented by the second n-gram representation. For example, the dictionary parser 638 can use the second n-gram representation to locate one or more second nodes in the morpheme graph (e.g., dictionary trie 632).

The process 700b also includes generating one or more permutations of a third lexical item from the one or more first lexical items and a fourth lexical item from the one or more second lexical items (745). For example, the dictionary parser 638 can generate the one or more permutations (e.g., permutations of Hanzi terms).

The process 700b also includes selecting a permutation from the one or more permutations of a third lexical item and a fourth lexical item, based on a second score associated with each of the one or more permutations of a third lexical item and a fourth lexical item (750). The selected permutation includes the third lexical item followed by the fourth lexical item.

The process 700b also includes comparing the first score of the selected first lexical item and the second score of the selected permutation (755), and providing the selected first lexical item or the selected permutation for display on the user device based on the comparison (760). For example, the dictionary parser 638 can select the permutation based on a second score (e.g., identified using the language model 639) and compare the first score and second score. In addition, the IME 630 can provide the selected first lexical item or the selected permutation for display on the user device based on the comparison.

Other Example Systems

Figure 8:
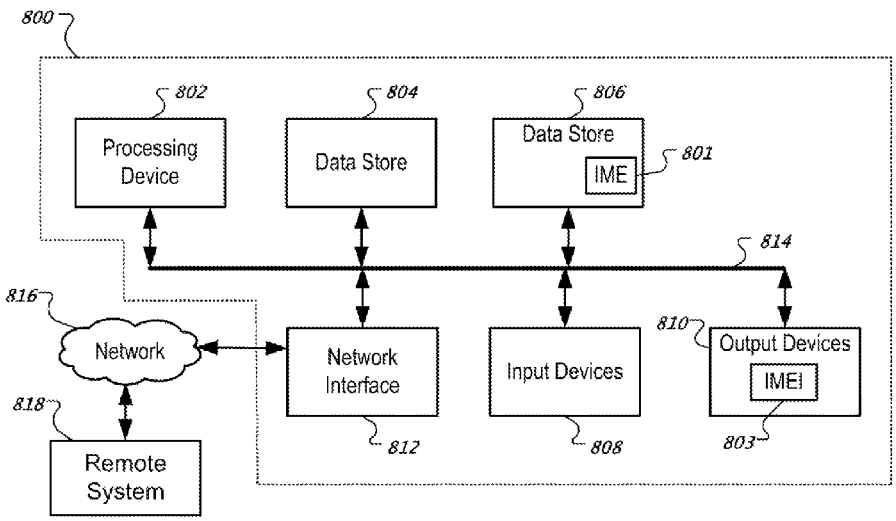
FIG. 8 is a block diagram of an example system that can be utilized to implement the systems and methods described herein.

FIG. 8 is a block diagram of an example system 800 that can be utilized to implement the systems and methods described herein. The example system 800 can, for example, be implemented in a computer device, such as a personal computer device, or other electronic devices, such as a mobile phone, mobile communication device, personal digital assistant (PDA), and the like.

The example system 800 includes a processing device 802, a first data store 804, a second data store 806, input devices 808, output devices 810, and a network interface 812. A bus system 814, including, for example, a data bus and a motherboard, can be used to establish and control data communication between the components 802, 804, 806, 808, 810 and 812. Other system architectures can also be used.

The processing device 802 can, for example, include one or more microprocessors. The first data store 804 can, for example, include a random access memory storage device, such as a dynamic random access memory, or other types of computer-readable medium memory devices. The second data store 806 can, for example, include one or more hard drives, a flash memory, and/or a read only memory, or other types of computer-readable medium memory devices.

Example input devices 808 can include a keyboard, a mouse, a stylus, etc., and example output devices 810 can include a display device, an audio device, etc. The network interface 812 can, for example, include a wired or wireless network device operable to communicate data to and from a network 816. The network 816 can include one or more local area networks (LANs) and/or a wide area network (WAN), such as the Internet.

In some implementations, the system 800 can include input method editor (IME) code 801 from a data store, such as the data store 806. The input method editor code 801 can be defined by instructions that upon execution cause the processing device 802 to carry out input method editing functions. The input method editor code 801 can, for example, comprise interpreted instructions, such as script instructions, e.g., JavaScript or ECMAScript instructions, that can be executed in a web browser environment. Other implementations can also be used, e.g., a stand-alone application, an applet, a plug-in module, etc.

Execution of the input method editor code 801 generates or launches an input method editor instance 803. The input method editor instance 803 facilitates the processing of one or more input methods at the system 800, during which time the system 800 can receive inputs for characters or symbols, such as, for example, Roman characters that represent Pinyin. For example, the user can use one or more of the input devices 808 (e.g., a keyboard, such as a Western-style keyboard, a stylus used with a handwriting recognition engine, etc.) to input Pinyin inputs for identification of Hanzi terms. In some examples, a Hanzi term can be composed of more than one Pinyin input.

The first data store 804 and/or the second data store 806 can store an association of inputs. Based on a user input, the input method editor instance 803 can use information in the data store 804 and/or the data store 806 to identify one or more candidate selections (e.g., permutations of lexical items) represented by the input. In some implementations, if more than one candidate selection is identified, the candidate selections are displayed on an output device 810. Using the input device 808, the user can select from the candidate selections a Hanzi term, for example, that the user desires to input.

In some implementations, the input method editor instance 803 on the system 800 can receive one or more Pinyin inputs and convert the inputs into Hanzi terms. The input method editor instance 803 can, for example, use compositions of Pinyin syllables (e.g., Roman characters) received from keystrokes to represent the Hanzi terms. Each Roman character can, for example, correspond to a key in the Western-style keyboard. Using a Pinyin input method editor, a user can input a Hanzi character by using inputs that include one or more Pinyin syllables representing the sound of the Hanzi character. Input methods for other languages, however, can also be facilitated.

In some implementations, a remote computing system 818 having access to the system 800 can also be used to edit a logographic script. For example, the system 800 may be a server that provides logographic script editing capability via the network 816. In one example, a user can edit a logographic script stored in the data store 804 and/or the data store 806 using a remote computing system, e.g., a client computer. The system 800 can, for example, select a character and receive an input from a user over the network interface 812. The processing device 802 can, for example, identify one or more characters adjacent to the selected character, and identify one or more candidate selections based on the received input and the adjacent characters. The system 800 can transmit a data communication that includes the candidate selections back to the remote computing system.

FIG. 9 is a block diagram of an example input method editor system 920. The input method editor system 920 can, for example, be implemented using the input method editor code 801 and associated data stores 804 and 806. The input method editor system 920 includes an input method editor engine 922, a grapheme graph 924 (e.g., grapheme graph 300), a morpheme graph 926 (e.g., morpheme graph 400), and a language model data store 928. Other storage architectures can also be used.

The language model data store 928 can define one or more language models, e.g., a Japanese language model, a Chinese language model, etc. Each language model can, for example, define a particular rule set, e.g., grammar particular to a language, phrase sets, verbals, etc., that can be used to determine a user's likely intent in entering a set of inputs. Each language model can also include a user history of a particular user, e.g., a dictionary of words and phrased often used by a particular user.

For example, a Chinese language model can include a Chinese grammar model. Example Chinese grammar models can include serial verb construction models, perfectives and imperfectives models, and other grammar models.

Based on inputs, e.g., keystrokes, a series of Pinyin inputs can be identified using the grapheme graph 924. The Pinyin inputs, in turn, can be utilized to identify Hanzi characters using the morpheme graph 926. The Chinese grammar model can be applied to the Hanzi characters to determine the likelihood of the user intending to input in the Chinese context. For example, an input string that results in Hanzi characters that are all verbs would be scored very low, but an input string that results that result with a verb and an object would be scored higher, etc. By way of another example, an input that results in the Chinese character string that reads "I love flowers" would receive a higher score, and an input string that results in the Chinese character string that reads "bed cow tv" would receive a lower score.

Other processes can be used to adjust the score. For example, infrequently used words of a particular language may be scaled lower, while an often used word or phrase as defined by a user profile may be scaled higher. Other implementations are possible.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus (e.g., processing device 802). The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving a first grapheme in a first writing system, the first grapheme representing only a portion of a first syllable in a second writing system;
using a grapheme graph of graphemes in the first writing system to identify a first n-gram representation in the first writing system of a first morpheme in the second writing system, wherein the first n-gram representation includes the first grapheme;
using the first n-gram representation to locate one or more first nodes in a morpheme graph, wherein each located first node in the morpheme graph represents one or more first lexical items in the second writing system, each of the one or more first lexical items represented by the first n-gram representation;
receiving a second grapheme in the first writing system, the second grapheme representing only a portion of a second syllable in the second writing system, wherein the first grapheme represents only a portion of a third morpheme that is different from a fourth morpheme represented only in part by the second grapheme, wherein the first and second graphemes are distinct characters separated by a space in an input string;
using the grapheme graph of graphemes in the first writing system to identify a second n-gram representation in the first writing system of a second morpheme in the second writing system, wherein the second n-gram representation includes the second grapheme;
using the second n-gram representation to locate one or more second nodes in the morpheme graph, wherein each located second node in the morpheme graph represents one or more second lexical items in the second writing system, each of the one or more second lexical items represented by the second n-gram representation;
generating one or more permutations of a third lexical item and a fourth lexical item, wherein the third lexical item is selected from the one or more first lexical items, and the fourth lexical item is selected from the one or more second lexical items;
selecting a permutation from the one or more permutations based on a second score associated with each of the one or more permutations, wherein the selected permutation includes the third lexical item followed by the fourth lexical item; and
providing the selected permutation for display on a user device.

2. The method of claim 1, wherein the grapheme graph includes a plurality of nodes, each node representing a grapheme in the first writing system, and wherein each node in a proper subset of the plurality of nodes corresponds to a full syllable, each corresponding full syllable including the graphemes of its corresponding node and of the nodes from which the corresponding node descends.

3. The method of claim 2, wherein the first n-gram representation represents a full syllable that corresponds to one of the nodes in the proper subset of nodes.

4. The method of claim 1, wherein the morpheme graph includes a plurality of nodes, each node representing one or more morphemes in the second writing system, and wherein each node in a proper subset of the plurality of nodes corresponds to a lexical item, each corresponding lexical item including the morphemes of its corresponding node and of the nodes from which the corresponding node descends.

5. The method of claim 4, wherein each morpheme corresponds to a Hanzi character.

6. The method of claim 1, wherein the first n-gram representation is representative of a full Pinyin syllable and each of the one or more lexical items is a Hanzi term.

7. The method of claim 1, wherein using the first n-gram representation to locate one or more nodes in a morpheme graph includes:
selecting an identifier of a first node in the grapheme graph that corresponds to the first n-gram representation; and
locating a second node in the morpheme graph that is associated with the identifier.

8. A computer-implemented method, comprising:
receiving a first input of a first Roman character;
using the first Roman character to locate a first Pinyin syllable node in a Pinyin input graph, the Pinyin input graph including a plurality of Pinyin syllable nodes, each Pinyin syllable node corresponding to a Roman character, wherein each Pinyin syllable node in a proper subset of the plurality of Pinyin syllable nodes corresponds to a Pinyin syllable, each corresponding Pinyin syllable including the first Roman character and other Roman characters of its corresponding Pinyin syllable node and the Pinyin syllable nodes from which the corresponding Pinyin syllable node descends;
using the located Pinyin syllable node to locate one or more first Hanzi character nodes in a Pinyin syllable graph, the Pinyin syllable graph including a plurality of Hanzi character nodes, each Hanzi character node corresponding to a Pinyin syllable, wherein each Hanzi character node in a proper subset of the plurality of Hanzi character nodes corresponds to one or more first Hanzi terms, each corresponding one or more first Hanzi terms including Hanzi characters that correspond to Pinyin syllables of its corresponding Hanzi character node and the Hanzi character nodes from which the corresponding Hanzi character node descends;
receiving a second input of a second Roman character, wherein the first and second inputs collectively represent an input string and the first and second Roman characters are distinct characters represented by a space in the input string;
using the second Roman character to locate a second Pinyin syllable node in the Pinyin input graph, wherein the second Pinyin syllable node represents a Pinyin syllable that includes the second Roman character input;
using the second located Pinyin syllable node to locate one or more second Hanzi character nodes in the Pinyin syllable graph, wherein each located second Hanzi character node corresponds to one or more second Hanzi terms; and
generating one or more permutations of a third Hanzi term and a fourth Hanzi term, wherein the third Hanzi term is selected from the one or more first Hanzi terms, and the fourth Hanzi term is selected from the one or more second Hanzi items; and
selecting a permutation from the one or more permutations based on a second score associated with each of the one or more permutations for output to a user device, wherein the selected permutation includes the third Hanzi term followed by the fourth Hanzi term.

9. The method of claim 8, wherein using the located Pinyin syllable node to locate one or more Hanzi character nodes includes:
selecting an identifier of the located Pinyin syllable node; and
locating a first Hanzi character node in the Pinyin syllable graph that is associated with the identifier.

10. The method of claim 8, wherein the Pinyin syllable graph is a Patricia trie.

11. A computer-implemented method, comprising:
receiving, at a computing system having one or more processors, first and second characters in a first language, the first and second characters being distinct characters separated by a space in an input;
determining, by the computing system, possible first syllables in a second language that begin with the first character, the second language being a transliteration of the first language;
determining, by the computing system, possible second syllables in the second language that begin with the second character, wherein determining the possible first and second syllables each comprises (i) utilizing a grapheme graph and the respective first or second characters to identify a respective n-qram representation of a respective morpheme in the second language and (ii) utilizing a morpheme graph and the respective n-qram representation to identify the respective possible first or second syllables;
determining, by the computing system, permutations of the possible first and second syllables, each permutation representing a possible word in the second language;
selecting, by the computing system, a most likely permutation to obtain a selected word in the second language; and
outputting, from the computing system, the selected word, wherein receipt of the selected word causes the selected word to be displayed.

12. The computer-implemented method of claim 11, further comprising obtaining, by the computing system, scores for the permutations, each score being indicative of a likelihood that the input corresponds to a specific possible word represented by a specific permutation, wherein selecting the most likely permutation includes selecting a permutation having a highest score.

13. The computer-implemented method of claim 11, wherein determining the first and second possible words and the selected includes utilizing, by the computing system, at least two graphs.

14. The computer-implemented method of claim 13, wherein the at least two graphs include (i) a grapheme graph having nodes relating specific characters in the first language and words in the first language that begin with the specific characters and (ii) a morpheme graph having nodes relating specific syllable permutations in the first language and words in the second language, wherein determining the first and second possible words includes utilizing, by the computing system, the grapheme graph, and wherein selecting the selected word includes utilizing, by the computing system, the morpheme graph.

15. The computer-implemented method of claim 11, wherein the first language is Pinyin and the second language is Chinese.

16. A computing system including a memory having instructions stored thereon and one or more processors configured to execute the instructions, which causes the one or more processors to perform operations comprising:
receiving first and second characters in a first language, the first and second characters being distinct characters separated by a space in an input to the computing device;
determining possible first syllables in a second language that begin with the first character, the second language being a transliteration of the first language;
determining possible second syllables in the second language that begin with the second character, wherein determining the possible first and second syllables each comprises (i) utilizing a grapheme graph and the respective first or second characters to identify a respective n-qram representation of a respective morpheme in the second language and (ii) utilizing a morpheme graph and the respective n-qram representation to identify the respective possible first or second syllables;
determining permutations of the possible first and second syllables, each permutation representing a possible word in the second language;

selecting a most likely permutation to obtain a selected word in the second language; and outputting the selected word, wherein receipt of the selected word causes the selected word to be displayed at the computing device.

17. The computing system of claim 16, wherein the operations further comprise obtaining scores for the permutations, each score being indicative of a likelihood that the input corresponds to a specific possible word represented by a specific permutation, wherein selecting the most likely permutation includes selecting a permutation having a highest score.

18. The computing system of claim 16, wherein determining the first and second possible words and the selected includes utilizing at least two graphs.

19. The computing system of claim 18, wherein the at least two graphs include (i) a grapheme graph having nodes relating specific characters in the first language and words in the first language that begin with the specific characters and (ii) a morpheme graph having nodes relating specific syllable permutations in the first language and words in the second language, wherein determining the first and second possible words includes utilizing the grapheme graph, and wherein selecting the selected word includes utilizing the morpheme graph.

20. The computing system of claim 11, wherein the first language is Pinyin and the second language is Chinese.

* * * * *